Feb. 21, 1967    R. M. TOMCZAK ETAL    3,304,687
EVACUATION OF PLASTIC FILM PACKAGES
Filed Aug. 6, 1963    4 Sheets-Sheet 2
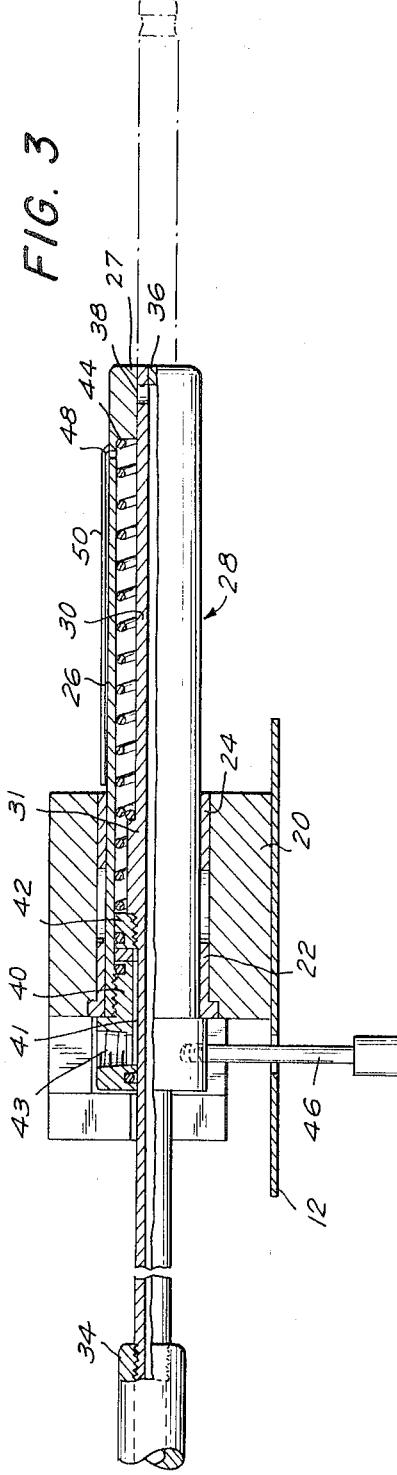
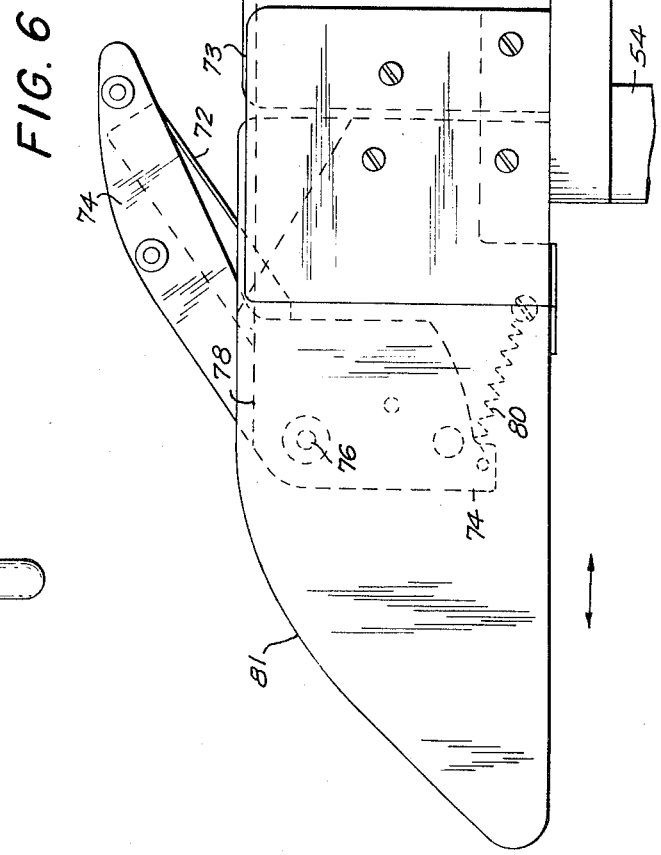
INVENTORS
MICHAEL J. MYLES
ROMAN M. TOMCZAK
BY
ATTORNEY

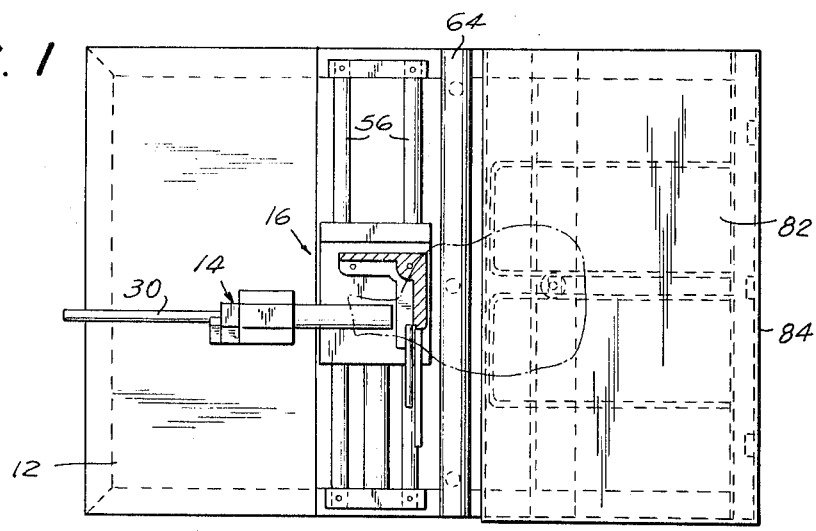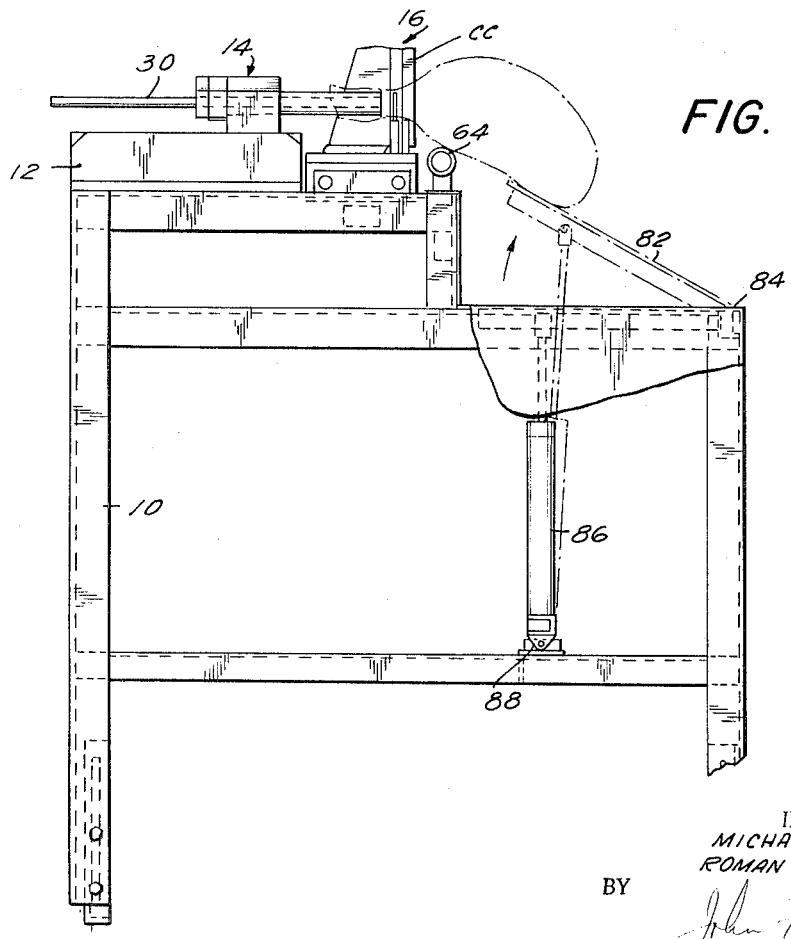

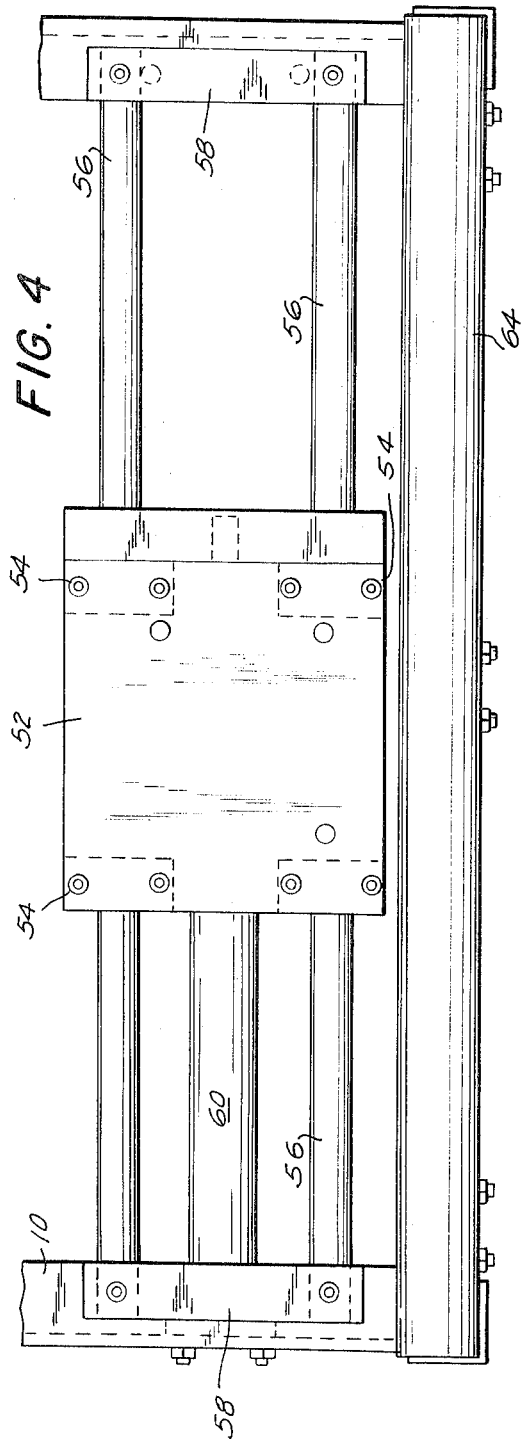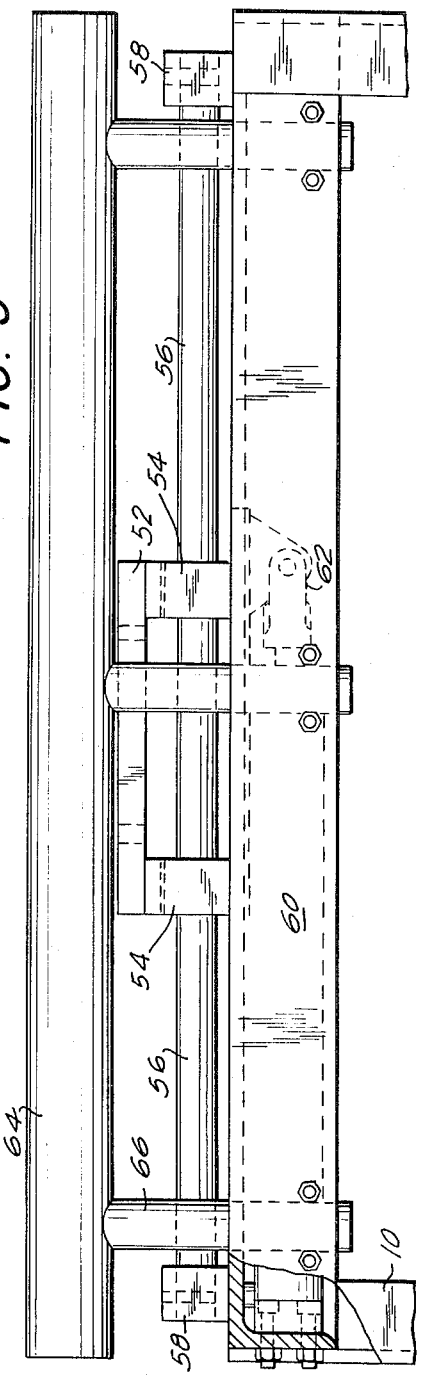

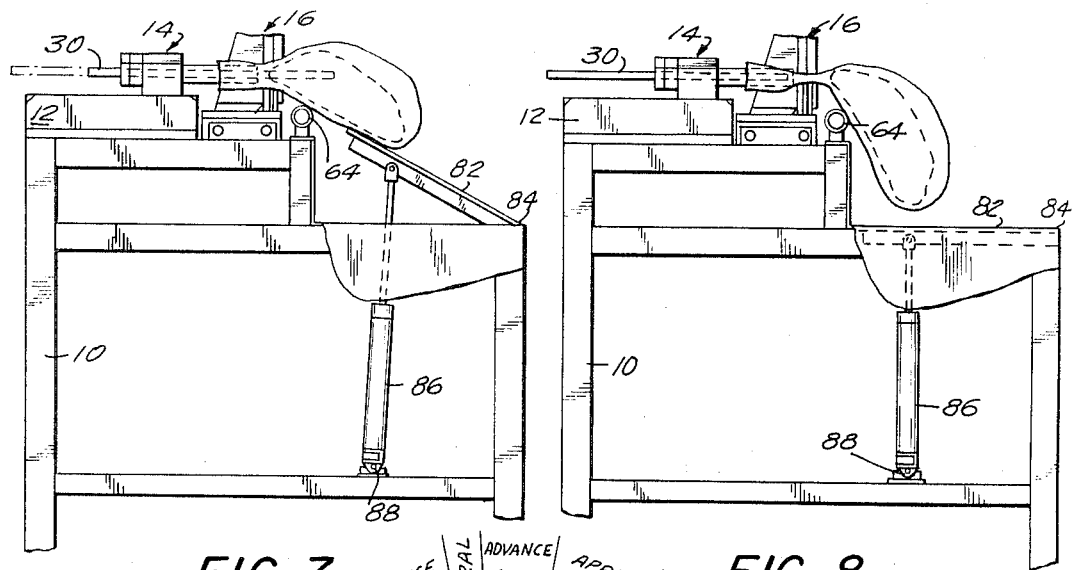
FIG. 7  FIG. 8
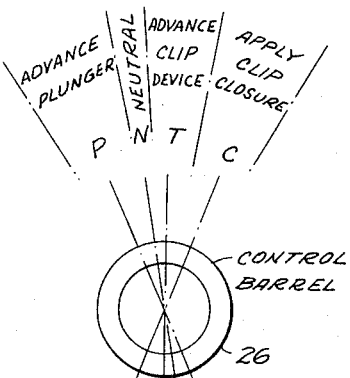
FIG. 9
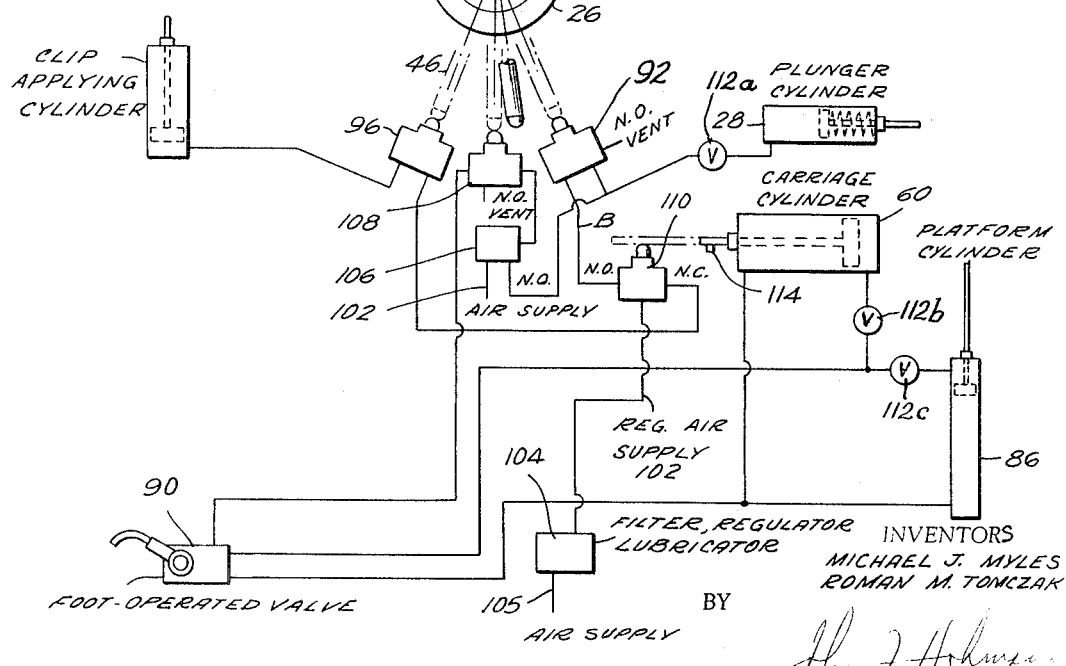
INVENTORS
MICHAEL J. MYLES
ROMAN M. TOMCZAK
ATTORNEY

United States Patent Office 3,304,687
Patented Feb. 21, 1967

3,304,687
EVACUATION OF PLASTIC FILM PACKAGES
Roman M. Tomczak, Willow Springs, and Michael J. Myles, Downers Grove, Ill., assignors to Union Carbide Corporation, a corporation of New York
Filed Aug. 6, 1963, Ser. No. 300,238
13 Claims. (Cl. 53—22)

The present invention relates generally to the evacuation of plastic film packages.

In the packaging of poultry and other articles in plastic film, it is important to remove air from the package for several reasons. For example, evacuation reduces expansion of air inside the packaging film in cases where the poultry is cooked in the package. Also, it prevents bridging of the film between protruding members, such as wings and thighs, and promotes a better shrink and cling of the film to the surface of the product during and after chilling. Methods heretofore proposed for evacuating film packages require that the film enveloped product be lifted onto a vertically arranged, fixed evacuating nozzle. The package is then rotated to twist and compress the neck of the pouch, removed from the evacuating nozzle, and transferred to a device for applying a clip closure. However, such methods are time consuming and require excessive product handling.

It is therefore, the main object of the present invention to provide an improved method and apparatus for evacuating and closing a plastic film package.

It is another object of the invention to provide such a method and apparatus which prevents the re-entry of air into the evacuated package.

It is a further object of the invention to provide such a method and apparatus which avoids excessive handling of the packaged product.

Other aims and advantages of the invention will be apparent from the following description and appended claims.

In the drawings:

FIG. 1 is a plan view of a preferred embodiment of the inventive apparatus;

FIG. 2 is an elevation view of the apparatus of FIG. 1;

FIG. 3 is an elevation view, partially in section, of the evacuating assembly 14 in the apparatus of FIG. 1;

FIG. 4 is a plan view of the carriage for the closing and cutting assembly 16 in the apparatus of FIG. 1;

FIG. 5 is an elevation view, partially in section, of the structure shown in FIGURE 4;

FIG. 6 is an elevation view of the cutting device in the apparatus of FIG. 1;

FIGS. 7 and 8 are schematic elevation views illustrating the operation of the apparatus of FIG. 1 and showing the effect on the pouch of plastic film; and FIG. 9 is a schematic diagram of the control system for the apparatus of FIG. 1.

In accordance with the present invention, there is provided a method and apparatus for packaging a hollow article in a pouch of flexible plastic film by placing the hollow article in the open pouch of flexible plastic film; inserting an evacuating plunger through the pouch opening and into the cavity of the hollow article; evacuating the air from the pouch and the cavity by drawing a vacuum through the plunger on the cavity and while retracting the plunger from the cavity and through the pouch opening, continuing to draw the vacuum on the cavity; and closing and sealing the evacuated pouch opening at a point adjacent to the hollow article while maintaining a vacuum on the pouch opening.

By advancing an evacuating plunger into the cavity of the hollow article to be packaged, drawing a vacuum through the advanced plunger, and then continuing to draw the vacuum as the plunger is retracted, the present invention evacuates the package and draws the film into tight engagement with the article surface while avoiding premature necking of the mouth of the film pouch. Moreover, by maintaining the vacuum on the pouch opening while it is being closed and sealed, the present invention not only eliminates the need for any twisting or rotating of the pouch neck, but also provides a completely evacuated package. Since the vacuum is maintained during the closing and sealing operations, no air is permitted to re-enter the package. As a result, the film in the final package clings tightly to the surface of the packaged article without bridging. Moreover, the resulting package can be heated with an absolute minimum of expansion in the pouch film.

A preferred embodiment of the invention will be described in greater detail by referring to the drawings.

Referring first to FIGURES 1 and 2, a table 12 is mounted on a stepped frame 10. Mounted on the table 12 and the frame 10 are an evacuating assembly 14 having a horizontal apertured tubular plunger 30 movable transversely in the axial direction, a clipping and cutting assembly 16 movable transversely in a direction at right angle to the axis of the plunger 30, a support rail 64, and a support platform 82 movable about a hinge 84.

The evacuating assembly 14 as shown in more detail in FIGURE 3. Secured to the table 12 is a mounting post 20 which is bored to receive bushings 22 and 24. Rotatably mounted within the bushings 22 and 24 is a single acting pneumatic cylinder assembly 28 generally comprising an evacuating barrel 26 having a plunger flange 27 at its forward end, a hollow evacuating plunger 30 mounted within the barrel 26 in contact with the flange 27, and a compression spring 44 in the annular cavity between the main body portion of the barrel 26 and the plunger 30. The forward end of the plunger 30 is closed by a plug 36 and provided with radial side openings 38, while the back end of the plunger 30 is connected to a vacuum line (not shown) through a hose coupling 34. The plunger 30 is also provided with a radial shoulder 31, the front end of which engages the compression spring 44 and the back end of which engages an annular piston 42.

Behind the piston 42 and secured to the barrel 26 is an annular gland 40 having a passage 41 extending therethrough to the piston 42. The back end of the passage 41 is connected to a source of compressed air (not shown) through a passage 43. The gland 40 is also provided with a radially extending operating lever 46. A vent hole 48 is provided in the front end of the barrel 26 just behind the flange 27, the vent hole 48 opening into a vent tube 50 fastened to the outer surface of the barrel 26 to conduct the vented air backward toward the post 20.

Mounted on the upper step of the frame 10 below the forward end of the evacuating assembly 14 is the clipping and cutting assembly 16, which is shown in more detail in FIGURES 4-6. Referring first to FIGURES 4 and 5, a conventional pneumatically operated bag closing device cc (see FIGURE 2) is vertically mounted on a carriage plate 52. The clip closure device cc may be any of the commercially available devices which are designed specifically to apply metal clip closures to plastic bags. Since such devices are already well known in the art, they will not be described in detail herein.

The carriage plate 52 is slidably mounted on two parallel carriage rails 56 by means of four bushed slide blocks 54 fastened to the four corners of the plate 52. The rails 56 are mounted on the frame 10 in frame mounting blocks 58 and permit the carriage plate 52 and the closing device mounted thereon to be advanced and retracted to and from the axis of the nozzle rod 30. The carriage plate 52 is driven by a double-acting pneumatic cylinder 60, the piston rod of which is connected to the carriage plate 52 by a clevis 62 and is actuated by a foot-operated pneumatic valve, as hereinafter described.

Mounted on the forward end of the carriage plate 52 is the cutting device shown in FIGURE 6. The cutting device comprises a spring-loaded angular swing knife blade 72 and an anvil member 73, the knife blade 72 and the surface of the anvil 73 forming a horizontal V. The knife blade 72 extends above the uppermost surface of the barrel 26 and is mounted in a sheath 74 that is pivoted about a fulcrum 76 in a mounting plate 78. The lower end of the sheath 74 is attached to the plate 78 by a spring 80. The surface of the anvil 73 should be about even with the lowermost surface of the barrel 26 of the evacuating assembly 14, and is provided with a channel or groove for receiving the sheath 74 and the knife blade 72. A guide strip 81 extends outwardly and down from the leading edge of the upper surface of the anvil 73.

As shown in FIGURES 1, 2, 4 and 5, a support rail 64 extending parallel to the carriage rails 56 is mounted on posts 66 on the side of the closing and cutting assembly 16 away from the evacuating assembly 14. The posts 66 may be mounted on a cross angle of the frame 10 by U-clamps so that the rail 64 can be adjusted vertically.

Mounted on the lower step of the frame 10 below the rail 64 is a support platform 82 rotatably fastened to a cross angle of the frame 10 by a hinge 84 (see FIGURE 2). The platform 82 is raised or lowered about the hinge 84 by a swing-mounted, single-acting, spring-loaded pneumatic cylinder 86 fastened thereto by a clevis 88. The platform 82 is arranged to slope upwardly (in its raised position) from a stuffing table (not shown) to assist in placing and gripping the mouth of a film package on the barrel 26 of the evacuating assembly 14. After the package has been evacuated, the platform 82 is dropped to suspend and stretch the film of the package over the support rail 64.

In operation, the hollow article to be packaged is initially placed in an open pouch of an elastic plastic film; the pouch is preferably somewhat smaller than the article to be packaged so that insertion of the article therein stretches the film and causes it to tightly engage the surface of the article. The package is then fed onto the support platform 82 in raised position, and the open mouth of the film bag or pouch is placed over the protruding barrel 26 of the evacuating assembly 14, as shown in FIG. 7. The platform 82 elevates and supports the package to assist in centering it on the vacuum nozzle during the evacuation cycle. After the neck of the film bag has been placed over the barrel 26, it is held firmly against the barrel surface while the evacuating plunger 30 is advanced into the cavity of the hollow article by admitting compressed air through the passage 41 against the piston 42. As the piston 42 and the plunger 30 are advanced, the spring 44 is compressed, and the air contained in the spring-containing cavity is vented through the hole 48 and the tube 50 outside the neck of the bag. As the plunger 30 enters the film, a vacuum is drawn through the radial openings 38 therein on the cavity of the hollow article. In the case of poultry packages, the plunger 30 is advanced into the poultry cavity, and the cavity is evacuated while the mouth of the plastic bag is gathered and sealed about the surface of the barrel 26 by an encircling hand grip of the operator. The plunger 30 is then retracted by venting the compressed air through the passage 41 so that the compression spring 44 expands and forces the plunger 30 and the piston 42 back to their original positions. The drawing of the vacuum continues during the retraction of the plunger 30 until the openings 38 are closed by the inner surface of the flange 27.

After the plunger 30 has been retracted, the platform 82 is dropped by venting the pneumatic cylinder 86, and the package is thereby suspended over the support rail 64 by the package mouth, which is still gathered and gripped on the barrel 26. At this point the package and the machine appear as shown in FIG. 8. The weight of the article in the suspended package tensions the film between the packaged article and the end of the barrel 26, and necks it down so that a metal clip or other closure can be applied immediately adjoining the packaged article. While the package is thus suspended, the closing and cutting assembly 16 is advanced until the clipping device $cc$ is aligned with the axis of the barrel 26. As the assembly 16 is advanced, the guide strip 81 guides the necked-down portion of the film over the knife sheath 74 and into the clipping zone. The force from the tensioned film depresses the knife blade 72 below the surface of the anvil 73. Upon advancing past the evacuator axis, the spring 80 returns the knife sheath 74 and blade 72 to cutting position. The film is then clipped, and the clipping and cutting assembly 16 is retracted. During retraction, the neck of the package is pulled into the V between the knife blade 72 and the surface of the anvil 73 and is severed just outside the clip. This completes an evacuated and clipped package.

Since the mouth of the film pouch remains firmly gripped against the barrel 26 while the pouch is being closed and sealed, a vacuum is maintained on the pouch opening during the closing and sealing operations, thus preventing re-entry of air into the film package. Alternatively, the evacuating plunger 30 may be retracted only part of the way into the barrel 26 so that it continues to draw a vacuum on the pouch opening during the closing and sealing operations. This further insures against any re-entry of the air into the evacuated package.

FIG. 9 is a schematic diagram of a typical pneumatic circuit for the aforedescribed apparatus. The steps of the method are sequenced manually by appropriate rotation of the evacuating (control) barrel 26 and a four-way foot-operated valve 90. The control barrel 26 is rotated from N, a neutral position; sequentially to P position controlling the advance of the evacuating nozzle; thence returned through N to T position controlling the advance of the clipping device to the bag neck; thence to C position controlling the application of a metal clip to the gathered bag neck. When the barrel 26 is rotated to operating position P, the lever 46 engages the stem of a valve 92 admitting air supply 102 from pilot line B of an interlock valve 110. Regulated air supply 102 to the valve 110 is provided from a filter, regulator, lubricator unit 104 connected to a compressed air supply 105.

As the valve 92 is opened, it permits regulated air pressure 102 to operate the cylinder 28, thereby advancing the evacuating plunger 30 connected to a vacuum receiver and pump. As the valve 92 is closed, it vents air from the cylinder 28, and the compression spring 44 retracts the plunger 30.

Regulated pressure 102 is also connected to a valve 106 which is a normally open pilot interlock valve, closed to pressure 102 when the cylinder 28 is operated. When the cylinder 28 is retracted, valve 106 pilot air is vented, thereby passing regulated air pressure 102 to a valve 108 which is a normally closed stem valve. When the barrel 26 is rotated to operating position T, the lever 46 engages the stem of valve 108, admitting air supply 102 to the foot-operated valve 90, and thereby provides an air supply for operation of the cylinders 60 and 86. When the foot-operated valve 90 is depressed, it connects air pressure 102 from valve 108 to advance the carriage 16 (cylinder 60 retracts), and at the same time, the cylinder 86 is vented thereby dropping the platform 82.

When the barrel 26 is rotated to operating position C, the lever 46 disengages valve 108 and engages the stem of valve 96. When valve 108 is disengaged, it closes and the air to the foot-operated valve 90 is vented, thus preventing operation of the carriage cylinder 60 during the operation of the pneumatic cylinders actuating the clipping device $cc$. When the stem of valve 96 is engaged, it passes air from valve 110 to cylinders actuating the clipping device cc. Valve 110 is a normally closed cam-operated interlock valve to pass regulated air pressure 102 to operate the cylinders of the clipping device cc only when (1) the cylinder 28 is retracted, and (2) the carriage 16 is advanced (cylinder 60 retracted). Adjustable speed control valves 112a; 112b; and 112c are used to regulate speed of cylinder action.

The air circuit described thus permits manual operation of the pneumatic foot-operated valve 90 in combination with manual control of the barrel 26, to advance the clipper carriage 16 into position for clipping, only when the evacuating nozzle is retracted, and to simultaneously lower the support platform 82, thus gathering and necking down the film at the mouth of the bag. Only after the clipper carriage 16 reaches its extreme advance position (clipping zone), and cam 114 engages valve 110, to thereby open the valve to regulated air 102, can the pneumatic cylinders of the clipper unit cc be actuated. After the metal clip has been applied to the bag neck, the barrel 26 is rotated back to operating position T thus re-establishing regulated air pressure 102 on the foot-operated valve 90. The foot-operated valve 90 may then be released to retract the clipper carriage 16 out of the clipping zone, thereby engaging the knife 72 mounted thereon to sever the film outside the clip. The regulated air pressure 102 that retracts the carriage 16 (cylinder 60 extended) also operates the cylinder 86, thereby raising the platform 82 to engage and guide the finished package to a conveyor.

While various specific forms of the present invention have been described and illustrated herein in some detail, it will be apparent that the same are susceptible of numerous modifications within the scope of the invention. For example, although the invention has been described with specific reference to metal clip closure devices, the invention is equally applicable to other well known closing and sealing devices.

What is claimed is:

1. A method for packaging an article in flexible plastic film comprising placing said article in an open pouch of flexible plastic film; evacuating air from said pouch by drawing a vacuum through the pouch opening by means of a horizontally disposed, nozzle so as to draw said film into tight engagement with said article; retaining said article and said pouch in the same plane as said nozzle such that a free flow path is maintained for evacuating said air therethrough; evacuating the air from said pouch without tensioning said film; tensioning the film of the mouth of said pouch by changing the plane of said article from the horizontal while simultaneously retaining the mouth of said pouch in the same plane as said nozzle; closing and sealing the pouch opening at a point adjacent to said article while maintaining a vacuum on said opening; and applying a metal clip to the thusly tensioned film.

2. A method for packaging an article in flexible plastic film comprising placing said article in an open pouch of flexible plastic film; inserting a horizontally disposed, evacuating nozzle through said pouch opening and evacuating air from said pouch by drawing a vacuum thereon without tensioning said film; retaining said article and said pouch in the same plane as said nozzle such that a free flow path is maintained during the evacuation of said air therethrough; retracting said evacuating nozzle through said pouch opening; tensioning the film of said pouch adjacent said pouch opening by changing the plane of said article from the horizontal while simultaneously retaining the mouth of said pouch in the same plane as said nozzle; and closing and sealing the thusly tensioned and evacuated pouch at a point adjacent to the packaged article while maintaining a vacuum on said pouch opening.

3. A method for packaging a hollow article in flexible plastic film, which method comprises: placing the hollow article in an open pouch of flexible plastic film; inserting a horizontally disposed evacuating plunger through the pouch opening and into the cavity of the hollow article; retaining said article and said pouch in the same plane as said plunger such that a free flow path is maintained for evacuating air therethrough; evacuating the air from said pouch and said cavity without tensioning said film by drawing a vacuum through said plunger on the cavity and, while retracting said plunger from said cavity and through the pouch opening, continuing to draw said vacuum on said cavity; tensioning the film of said pouch adjacent said pouch opening by changing the plane of said article from the horizontal while simultaneously retaining the mouth of said pouch in the same plane as said plunger; and closing and sealing the thusly tensioned and evacuated pouch opening at a point adjacent to said hollow article while maintaining a vacuum on said opening.

4. A method for packaging an article in flexible plastic film comprising placing said article in an open pouch of flexible plastic film; gripping the open end of said pouch against the surface of a horizontally disposed, rigid barrel having a movable evacuating nozzle telescoped therein; retaining said article and said pouch in the same plane as said nozzle such that a free flow path is maintained for evacuating air therethrough; evacuating the air from said pouch without tensioning said film by advancing said nozzle into said pouch and drawing a vacuum thereon, and then retracting said nozzle; tensioning the film of said pouch adjacent the open end of said pouch by changing the plane of said article from the horizontal while simultaneously retaining the mouth of said pouch in the same plane as said nozzle; and closing and sealing the thusly tensioned and evacuated pouch at a point adjacent to the packaged article while maintaining a vacuum on the pouch opening.

5. The method of claim 4 wherein a vacuum is maintained on the pouch opening during the closing and sealing thereof by maintaining the open end of said pouch manually gripped on said barrel.

6. A method for packaging a hollow article in flexible plastic film, which method comprises: placing the hollow article in an open pouch of an elastic plastic film which is stretched so as to tightly engage the surface of said article; gripping the open end of said pouch against the surface of a horizontally disposed, stationary, rigid barrel having a tubular evacuating plunger telescoped therein; retaining said article and said pouch in the same plane as said rigid barrel such that a free flow path is maintained for evacuating air through said evacuating plunger; advancing said evacuating plunger into the cavity of the hollow article; evacuating the air from said cavity and said pouch without tensioning said film by drawing a vacuum through said plunger on the cavity and retracting said plunger from said cavity while continuing to draw said vacuum on said cavity; tensioning the portion of said pouch between said article and the end of said barrel by changing the plane of said article from the horizontal while simultaneously retaining the mouth of said pouch in the same plane as said rigid barrel; necking down that portion of the pouch adjacent to said barrel; and, closing and sealing the necked down portion of the pouch at a point adjacent to the hollow article while maintaining a vacuum on the pouch opening.

7. Apparatus for evacuating and sealing an open pouch of flexible plastic film containing an article to be packaged comprising: an evacuating nozzle connected to means for drawing a vacuum through openings in the end of said nozzle; means for supporting said article and said pouch substantially horizontal with respect to said nozzle; means for advancing and retracting said evacuating nozzle through the opening of said pouch so as to draw a vacuum through the pouch opening; means for lowering said support means such that said article in said pouch is perpendicularly suspended while the opening of said pouch is simultaneously retained horizontally disposed to said nozzle; means for closing and sealing the pouch opening at a point adjacent to the packaged article; means for maintaining a vacuum on said pouch opening while said pouch is being closed and sealed.

8. Apparatus for evacuating and sealing an open pouch of flexible plastic film containing a hollow article to be packaged, which apparatus comprises: a horizontal evacuating plunger movably mounted to be advanced and retracted through the pouch opening; means for supporting said pouch and said article substantially horizontal with respect to said plunger; means for advancing said plunger through the pouch opening and into the cavity of the hollow article therein and then retracting said plunger; means for drawing a vacuum through said plunger on said cavity while said plunger is in the advanced position and for continuing the drawing of said vacuum while said plunger is retracted; means for lowering said support means such that said article in said pouch is perpendicularly suspended while the film adjacent said pouch opening is simultaneously retained horizontally disposed with respect to said plunger; means for closing and sealing said pouch opening at a point adjacent to said hollow article while maintaining a vacuum on said opening.

9. Apparatus for evacuating and sealing an open pouch of flexible plastic film containing an article to be packaged comprising: an evacuating nozzle telescoped within a stationary rigid barrel, said barrel being adapted to have the open end of said pouch gripped on the outer surface thereof; means for supporting said pouch and said article substantially horizontal with respect to said barrel; means for advancing said evacuating nozzle out of said barrel and into a pouch gripped on said barrel; means for drawing a vacuum through said nozzle so as to evacuate the air from said pouch and draw said film into tight engagement with said article; means for retracting said nozzle back into said barrel; means for lowering said support means such that said article in said pouch is perpendicularly suspended while the film adjacent the open end of said pouch is simultaneously retained horizontally disposed with respect to said barrel; means for closing and sealing the evacuated pouch while the open end thereof remains gripped on said barrel so as to maintain a vacuum on the pouch opening during said closing and sealing thereof.

10. Apparatus for evacuating and sealing an open pouch of flexible plastic film containing a hollow article to be packaged, which apparatus comprises: a stationary rigid barrel adapted to fit into the mouth of said open pouch, said barrel having a tubular evacuating plunger telescoped therein; means for supporting said pouch and said article substantially horizontal with respect to said barrel; means for advancing said plunger from said barrel through the mouth of said pouch into the cavity of said hollow article therein, and for retracting said plunger; means for drawing a vacuum through said plunger on said cavity while said plunger is in the advanced position and for continuing the drawing of said vacuum as said plunger is retracted; means for lowering said support means such that the portion of said pouch between said article and the end of said barrel is placed in tension and said article in said pouch is perpendicularly suspended while the mouth of said pouch is simultaneously horizontally disposed with respect to said barrel so as to neck down that portion of the pouch after said plunger has been retracted; and means for closing and sealing the necked down portion of the pouch at a point adjacent to said article while maintaining a vacuum on the pouch opening.

11. The apparatus of claim 10 wherein said barrel is rotatable to various successive operating positions, said apparatus having a control system comprising: means responsive to rotation of said barrel to a first position for actuating means for advancing said plunger; means responsive to rotation of said barrel to a second position for actuating means for retracting said plunger; means responsive to rotation of said barrel to a third position for activating means for actuating means for tensioning the film at the mouth of said pouch and concurrently actuating means for advancing and retracting the closing and sealing means with respect to the tensioned film; and means responsive to rotation of said barrel to a fourth position and also responsive to said closing and sealing means in its advanced position for actuating means for operating said closing and sealing means.

12. Apparatus for evacuating and sealing an open pouch of flexible plastic film containing a hollow article to be packaged, which apparatus comprises: a rigid barrel adapted to fit into the mouth of said open pouch, said barrel having a tubular evacuating plunger telescoped therein; means for advancing said plunger from said barrel through the mouth of said pouch into the savity of said hollow article therein, and for retracting said plunger; means for drawing a vacuum through said plunger on said cavity while said plunger is in the advanced position and for continuing the drawing of said vacuum as said plunger is retracted; means for spacing said article from the end of said barrel and tensioning the portion of said pouch between said article and the end of said barrel so as to neck down that portion of the pouch after said plunger has been retracted; means for closing and sealing the necked down portion of the pouch at a point adjacent to said article while maintaining a vacuum on the pouch opening; means for advancing said closing and sealing means from a station spaced from said necked down portion of the pouch, and for retracting said closing and sealing means; means responsive to the retraction of said closing and sealing means for severing said necked down portion of the pouch intermediate said seal and the open end of the pouch.

13. Apparatus for evacuating and sealing an open pouch of flexible plastic film containing a hollow article to be packaged, which appartus comprises: a rigid barrel adapted to fit into the mouth of said open pouch, said barrel being rotatable to various successive operating positions and having a tubular evacuating plunger telescoped therein; and a control system having means responsive to rotation of said barrel to a first position for actuating means for advancing said plunger from said barrel through the mouth of said pouch into the cavity of said hollow article therein; means responsive to rotation of said barrel to a second position for actuating means for retracting said plunger; means for drawing a vacuum through said plunger on said cavity while said plunger is in the advanced position and for continuing the drawing of said vacuum as said plunger is retracted; means responsive to rotation of said barrel to a third position for activating means for actuating means for tensioning the portion of the film of said pouch between said article and the end of said barrel so as to neck down that portion of the pouch at a point adjacent to said article while maintaining a vacuum on the pouch opening and concurrently actuating means for advancing and retracting the closing and sealing means with respect to the tensioned film; and means responsive to rotation of said barrel to a fourth position and also responsive to said closing and sealing means in its advanced position for actuating means for operating said closing and sealing means.

References Cited by the Examiner

UNITED STATES PATENTS

| | | | |
|---|---|---|---|
| 2,812,628 | 11/1957 | Russell et al. | 53—112 X |
| 2,924,924 | 2/1960 | Garapolo et al. | 53—112 |
| 3,175,590 | 3/1965 | Belknap | 53—112 X |
| 3,208,193 | 9/1965 | Rumsey | 53—112 |

TRAVIS S. McGEHEE, *Primary Examiner.*